Figures 1, 2, 3:
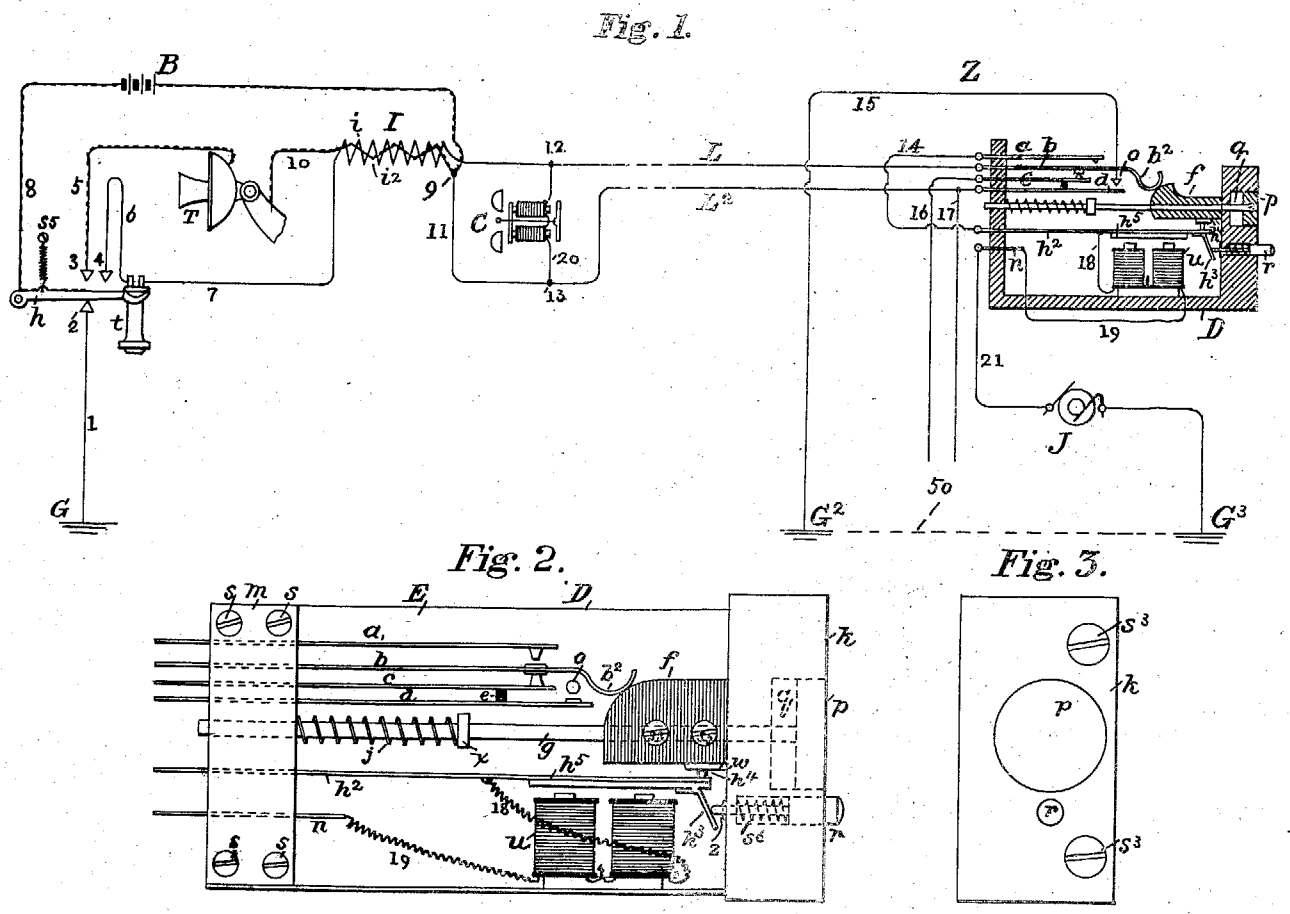

J. J. O'CONNELL.

SIGNALING CIRCUIT.

No. 11,645. Reissued Dec. 28, 1897.

Attest.

S. W. Tanner

A. D. Lawrence

Inventor,

Joseph J. O'Connell.

By Bartow & Brown,

Attorneys.

UNITED STATES PATENT OFFICE.

JOSEPH J. O'CONNELL, OF CHICAGO, ILLINOIS, ASSIGNOR, BY MESNE ASSIGNMENTS, TO THE WESTERN ELECTRIC COMPANY, OF SAME PLACE.

SIGNALING-CIRCUIT.

SPECIFICATION forming part of Reissued Letters Patent No. 11,645, dated December 28, 1897.

Original No. 555,707, dated March 3, 1896. Application for reissue filed October 20, 1897. Serial No. 655,866.

*To all whom it may concern:*

Be it known that I, JOSEPH J. O'CONNELL, a citizen of the United States, residing at Chicago, in the county of Cook and State of Illinois, have invented a certain new and useful Improvement in Signaling-Circuits, of which the following is a full, clear, concise, and exact description, reference being had to the accompanying drawings, forming a part of this specification.

This invention relates to signaling between the stations of an electric circuit, and, generally stated, comprises a system in which the signal-sending appliances at one station when actuated remain in their working position, effectuating the continuous giving of the signal at the other station until the attendant at the said other station takes proper action in response thereto.

Though capable of a variety of applications, this invention is especially applicable to telephonic circuits extending between substations and a central station, and when so applied it may with advantage be embodied in the forms of apparatus more particularly described hereinafter in this specification and illustrated in the drawings accompanying the same.

As shown, the electric circuit extends between two stations and is at one of them associated with a key or circuit-changer, which, when operated, disconnects the original circuit-terminals, establishes new terminal connections, introduces the call-generator into the circuit, and is automatically locked in its new and operative position, also at the same station with the said call-generator, and an electromagnet in the circuit thereof wound with but few turns of coarse wire, or otherwise so constructed or adjusted in any well-known way that it is made irresponsive to signaling-currents of normal strength, but becomes responsive to any material increase in the strength of the said current such as might be brought about by a change in the resistance of the circuit when caused by connecting the low-resistance communicating instruments of the other station in the circuit in place of or in parallel with a high-resistance signal-receiving instrument. The excitation of the electromagnet and the consequent attraction of its armature releases or unlocks the signal-sending key, which thereupon automatically resumes its non-operative position. At the other or second station the circuit is normally closed through a high-resistance path or branch, but has an alternative normally open path or branch preferably of low resistance and a switch or circuit-changer, which in one position maintains the continuity of the former, holding the latter open, but when placed in a second position may reverse this arrangement, substituting the low-resistance path for the high-resistance path or, preferably, connecting it in parallel therewith, in either case reducing materially the total circuit resistance.

The two stations may be the central and sub stations of a telephone-circuit, the last mentioned being the substation. In that event the normally closed branch of course contains the usual high-resistance polarized bell. The alternative route includes the telephones of standard resistance, which, as well known, is much lower than that of such bells, and the switch is the usual automatic telephone-switch actuated by the removal and replacement of the telephone and operating thereupon to effectuate the necessary circuit changes outlined above and in turn to reverse the said changes when required. Thus when the key at the central station is operated and is automatically locked the normal circuit is there changed, its two main conductors are united to the terminals of the call-generator, and the signal-bell at the substation is made to ring and continues to ring as long as the key remains in operative position, and when the circuit-changer at the substation is operated, say by taking the telephone from its support, in response to the ring of the signal-bell the latter is shunted or replaced by the telephone instruments, the resistance of the circuit thereby decreased, and the calling-current thereby strengthened, so that the low-resistance electromagnet at the first central station is made operative and withdraws the locking device from the key, releasing the same, restoring the normal condition of the circuits at said station, and causing the operation of the call-bell at the substation to cease. The key is itself a signal to the person at the first station, as when it is locked its appearance indicates that the call-current is on the circuit, and when it is automatically reset it serves to indicate that the person at the second station has noticed the call-signal and has operated the circuit-changer there.

I provide means whereby the person at the first station may mechanically unlock the key if for any reason it becomes necessary to do so.

My invention also relates to the construction and arrangement of a circuit-changing key, which when operated to change the circuits becomes automatically locked and retains the circuits fixed in their changed relation and which can be automatically released from a distance or mechanically released by its operator to restore the circuits to their normal condition. The said key consists of a spring-retracted rod carrying a cam or wedge and of four flat contact-springs and is associated with a flat-spring armature, a low-resistance or non-sensitive electromagnet, (the armature constituting a locking device with the said rod,) and a mechanical releasing device, all of which are secured to and operate in a suitable frame or support, which may be of insulating material, as the several parts must be insulated from each other.

When the key is depressed, its wedge forces the spring connected to one of the main-circuit conductors away from its normal contact into contact with another spring which is in circuit with the helices of the said electromagnet and the source of the calling-currents in a normally open branch or extension circuit, while the contact-spring of the other main-circuit conductor completes a circuit with the said branch. The key may be released electrically from a distance or mechanically at the home station, as will be hereinafter described.

In carrying out my invention I have for the purposes of this specification associated it with a telephone-circuit extending between the central station and a substation, as fully illustrated in the accompanying drawings.

Figure 1 is a diagram of an electric telephone signaling-circuit in which so much of the central-office apparatus is shown as is necessary to illustrate the operation of the invention, all of the substation apparatus and circuits being indicated. Figs. 2 and 3 are respectively side and end elevations of the call-key employed by the operator at the central station.

Referring to all of the figures, D represents a circuit-changing switch consisting of a backing E, to the opposite ends of which are secured the blocks $m$ and $k$ of insulating material, the former by means of the screws $s$ $s$ and the latter by the screws $s^3$ $s^3$. The rod $q$ extends through both blocks $m$ and $k$, as indicated, and is provided with a button $p$, which is inclosed in the recess $q$ in the latter block, so that normally its face is flush with the end thereof. A cam or wedge $f$, of non-conducting material, is secured to the rod $g$ by means of the screws $s^2$ $s^2$, and a collar $x$ upon the rod affords an abutment, against which the spiral spring $j$ presses and keeps the rod with the cam and button in the outward position shown.

$a$, $b$, $c$, and $d$ are flat contact-springs held at one end and insulated from one another by the block $m$. The spring $a$ is connected by wire 14 with the armature-spring $h^2$, which is secured in the block $m$, and whose outer end $h^5$ serves as the armature of the low-resistance electromagnet $u$ and is provided with a locking-pin $h^4$ and an inclined extension $h^3$.

$r$ is a spring-retracted releasing button or pin, its inner end being reduced in diameter to receive the spiral spring $s^6$, which presses against the shoulder of the pin and the shoulder in the block $k$. The outer end of the pin is in proximity to the extension $h^3$ and is secured by a small key, as shown. The spring $h^2$ is electrically united by wire 18 to the electromagnet and the latter by wire 19 to the metal connection-rod $n$, from which wire 21 extends to generator J and ground or return conductor $G^3$. The free end of the spring $b$ is curved and rests upon the face of the wedge $f$, its central part being normally in electrical contact with the spring $c$ and its outer end united to conductor L of the main circuit.

The springs $c$ and $d$ are insulated from each other by the mechanical connection-piece $e$ and are placed in a state of tension by the superior rigidity of the spring $b$, the spring $c$ being connected by wire 16 to the usual switchboard appliances and the spring $d$ to the conductor $L^2$ of the main circuit and also by a wire 17 to the said switchboard appliances.

The conductor $L^2$ extends to the substation and continues through the primary helix $i^2$ of the induction-coil I and, to complete the local transmitter-circuit, by wire 10 to the telephone-transmitter T, thence by wire 5 to the normally open contact 3. To complete a charging-circuit for the transmitter-battery from the central station, it continues by a branch wire 8 from a point 9 on the conductor $L^2$ through the battery B to the hook-switch $h$, and from thence normally by contact 2 and wire 1 to ground G. The conductor L extends to the secondary helix $i$ of the induction-coil I and wire 7, telephone-receiver $t$, and wire 6 to the normally open contact 4 to form the main-line talking-circuit and the low-resistance parallel path through the station on the operation of the switch $h$.

A high-resistance bell C is permanently included in the bridge or normally closed path 20 between the conductors L and $L^2$ at the points 12 and 13 and forms the normal or high-resistance path through the station.

It will be seen that normally there is a circuit from ground G by contact-point 2, hook-switch $h$, wire 8, and conductor $L^8$ to wire 17, and a second circuit for signaling over the same path, supplemented, however, by a return route leading through wire 16, conductor L, and signal-bell C.

To operate the signal at the central-office switchboard, the telephone $t$ is removed from the hook-switch, which rising, impelled by the spring $s^3$, takes off the ground G and closes the main conductor-circuits just described through the telephone branch extending from the switch-contact 4 to the point 9 on conductor $L^2$ and containing the receiver and induction-coil, all in a manner well understood and forming no part of this invention.

In the operation of the invention, when the central-station operator wishes to signal the substation the button $p$ is pressed inward until it strikes the bottom of the recess $q$. The plate $w$ upon the under side of the wedge $f$ has then passed from the pin $h^4$ and the resiliency of the spring $h^2$ has brought the pin upward, so that it has engaged the end of the plate $w$ and locked the rod $g$ and wedge $f$ in its depressed or operative position. The wedge $f$ forces the spring $b$ upward, separating it from the spring $c$ and pressing it into contact with spring $a$. The springs $c$ and $d$ follow the rising of the spring $b$ by reason of their resiliency until the end of the spring $d$ comes to rest under the contact $o$.

The changes effected in the circuits will be seen by tracing from ground $G^3$, wire 21, and generator J, rod $n$, wire 19, electromagnet $u$, wire 18, spring $h^2$, wire 14, springs $a$ and $b$, conductor L to point 12, wire 20, and bell C, point 13, conductor $L^2$, spring $d$, contact $o$, wire 15 to ground $G^2$, and the current from the generator J passing over this circuit causes the bell C to ring, which ringing continues until the circuit is again changed. When the telephone $t$ is removed from its support in answer to the call, a low-resistance parallel circuit is established by the switch $h$ round the high-resistance bell C, which is thereby shunted, and as the resistance of its helices are removed from the direct circuit or are to be considered jointly with that of the telephones the current from the generator J is thereby strengthened, so that it sufficiently excites the electromagnet $u$, and its armature $h^3$ is attracted, releasing the pin $h^4$ from the plate $w$ and permitting the spiral spring $j$ to force the rod $g$, with its wedge $f$, away from the spring $b$, whose resiliency restores the circuits to their normal condition. The circuit formed by the removal of the telephone from its support may be traced from generator J, wires 21 and 19, electromagnet $u$, wire 18, spring $h^2$, wire 14, springs $a$ and $b$, conductor L, secondary helix $i$, wire 7, telephone $t$, contact 4, switch $h$, wire 8, and battery B to point 9, wire 11, conductor $L^2$, spring $d$, contact $o$, and from ground $G^3$ to ground $G^2$.

The return-wire 50 may be substituted for the grounds in a manner well understood. If there is no response from the substation, the operator may restore the circuit and cut off the generator therefrom by pressing the stud $r$, whose inner end $z$ presses against the inclined extension 13 and forces the armature and its pin $h^4$ away from the plate $w$, whereupon the spring $j$ operates in the manner previously described. The button $p$ serves as a signal to the operator to indicate whether the current from the generator is flowing on the line or not, for if it is the button is depressed, and if not it is flush with the face of the block $k$.

Having now fully described my invention, I claim—

1. In an electric circuit, the combination of a high-resistance signaling instrument connected therewith, a signal-current generator; a key or circuit-changer controlling the said generator and adapted to connect it with the said circuit, an automatic locking device for the said key adapted to hold the same in operative position, means for strengthening the said signaling-current after the signal has been received, consisting of a normally open branch circuit of relatively low resistance associated in parallel with the said signaling instrument and a switch for closing the same, to reduce the circuit resistance, and a releasing-electromagnet associated with the said key and adapted to unlock the same, the said magnet being irresponsive to the normal signaling-current, but responsive to the same when strengthened by the closure of the low-resistance branch, substantially as described.

2. An electric circuit connecting two stations, provided at the first station with a circuit-changing and self-locking call-key, a low-resistance key-releasing electromagnet, and a generator of call-currents; and at the second station with a high-resistance call-receiving apparatus in a bridge between the conductors of the circuit, and a relatively low-resistance communicating apparatus in a normally open branch parallel with the said call-receiving apparatus between the said conductors whereby the key having been locked as described may be released automatically, upon the closure of the normally open parallel circuit shunting the call-receiving apparatus, and the consequent strengthening of the call-currents, substantially as described.

3. In a telephone-circuit connecting a central station, with a substation, the combination of a circuit-changing and self-locking call-key, a generator of signaling-currents and a low-resistance lock-controlling electromagnet in the circuit of said generator placed at the former station; with a high-resistance call-bell connected between the circuit main conductors, a normally open branch circuit containing the station-telephones, in parallel with the said bell branch, and of relatively low resistance, and an automatic telephone-supporting switch controlling the said open branch and adapted on the removal of the telephone from its support to close the same, at the latter station, whereby the call-current is sent to line and the key locked on the operation of the said key at one station, and whereby the said electromagnet is excited and the key released, when the telephone is taken from its support at the other station, substantially as and for the purpose specified.

4. The combination of a telephone-circuit extending between two stations; a closed call-bell branch and a normally open telephone branch constituting paths of high and low resistance respectively between the main-circuit conductors, and a switch holding the low-resistance branch closed or open according to its position, at one of the said stations; and a call-generator, a key controlling the same, and when operated adapted to connect it with the circuit, a lock or detent adapted to hold the said key in operation, and a releasing-electromagnet interposed in the generator-circuit at the other of said stations; the said magnet being wound or adjusted to be irresponsive to the current of the generator when the switch at the first station is in its high-resistance position, but to become responsive thereto, release the key and disconnect the generator when strengthened by the transfer of the said switch to its low-resistance position.

5. The combination of an electric circuit and a key which when manipulated disconnects the normal terminal connections of the circuit-conductors and connects one of the said conductors with one end of a call branch, including an electric generator and an electromagnet, and at the same time connects the other side or conductor of the circuit with the opposite end of the said call branch; means for locking the key; and means for both automatically and manually releasing the same.

6. The combination of an electric circuit with a key which when manipulated disconnects the normal terminal devices of the circuit-conductors and connects one of the said conductors with a grounded call branch, including an electric generator, and an electromagnet and at the same time connects the other side or conductor of the circuit with the ground; means for automatically locking the key when it is manipulated, means for automatically releasing it from a distance, and means associated with the said key also for manually releasing the same.

In witness whereof I hereunto subscribe my name this 18th day of October, A. D. 1897.

JOSEPH J. O'CONNELL.

Witnesses:
JOHN W. SINCLAIR,
MINA L. SWARTWOUT.